United States Patent Office 2,940,941
Patented June 14, 1960

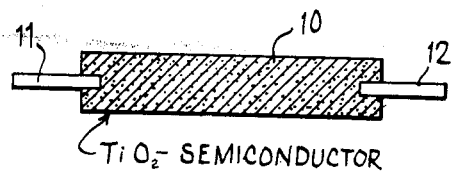
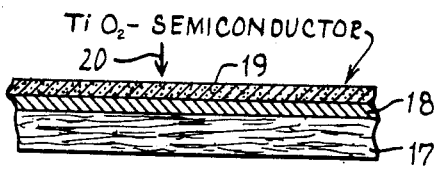
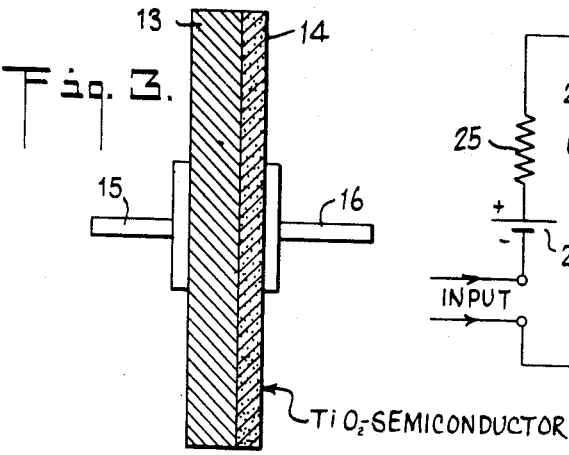
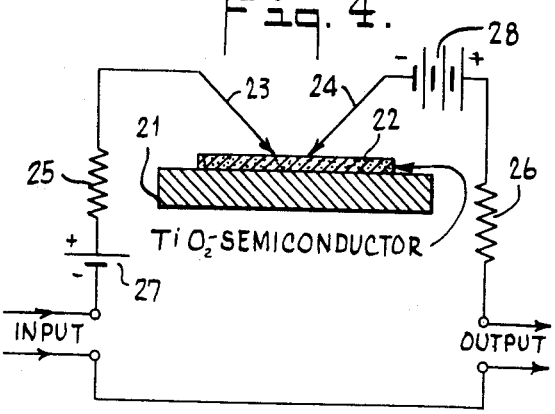
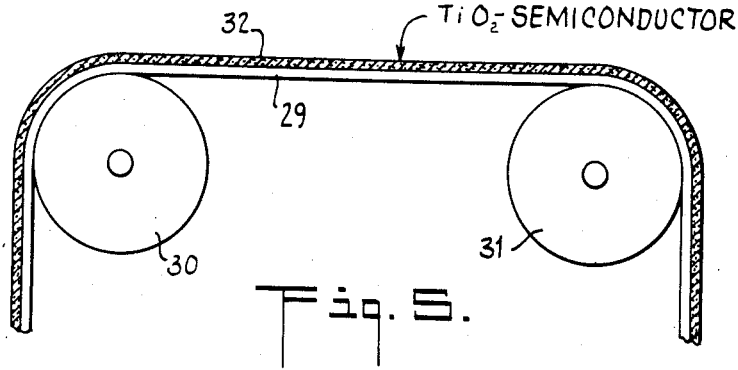
INVENTOR.
HAROLD R. DALTON

2,940,941
MODIFIED TITANIUM DIOXIDE AND METHOD OF PREPARATION

Harold R. Dalton, Jenkintown, Pa., assignor to Timefax Corporation, New York, N.Y., a corporation of New York Filed May 26, 1953, Ser. No. 357,399

7 Claims. (Cl. 252—512)

This invention relates to new compositions of matter and more particularly it relates to novel resistance materials and methods of manufacture thereof, which materials are constituted mainly of titanium dioxide as the semiconductor.

Methods have been previously disclosed of making resistance materials having particularly desirable characteristics, from combination of metal oxides in proper relative proportions fired at temperatures ranging from 1000° C. to 1400° C. These materials are ceramic-like or sintered bodies shaped in the form of discs or plates to be used as semiconductors. Their use as mere resistors is well-known in the electrical arts.

Another group of materials not generally considered as semiconductors because of their very high resistance and utility for other purposes, are the phosphors and fluorescent materials made from metallic oxides. In order to induce good fluorescent properties they require a great deal of care in their manufacture to keep all ingredients of exceptionally high purity. They are also fired to exacting temperature schedules to promote proper crystal growth and luminescent properties, the firing temperatures being in the range of approximately 1000° C. to 1500° C. The use of this group of materials is well-known in the television and cathode-ray tube arts.

An object of the invention is to produce a material of low specific resistance from titanium dioxide and a free metal or combination of metals.

A more specific object of the invention is to greatly lower the specific resistance of titanium dioxide and composite materials incorporating such oxide.

While titanium dioxide has been used quite generally in the various arts, for example as a pigment for paints and the like, its electrical conductivity has been immaterial.

Another object of the invention is, therefore, to produce a material of low specific resistance nothwithstanding, that it is in a finely divided form.

Another object is to produce a composite material comprising as a substantial constituent thereof a powdered component of titanium dioxide which in the normal powdered state has relaively high specific resistance, and firing the material at a temperature of approximately 600° C. to 900° C. so that the product has a relatively low specific resistance.

A feature of the invention relates to an improved semiconductor element constituted mainly of modified titanium dioxide according to the invention.

Another feature relates to an electrically sensitive recording blank having a surface coating constituted mainly of modified titanium dioxide according to the invention.

Another feature relates to an improved contact rectifier employing a plate or plates of modified titanium dioxide according to the invention.

Another features relates to an improved form of "transistor" using a modified titanium dioxide.

Another feature relates to a coating for use in the various arts to effect a discharge of static electricity.

Another feature relates to the novel organization of method steps for producing an improved semiconductor constituted mainly of modified titanium dioxide.

In the drawings,

Fig. 1 shows a semiconductor resistance according to the invention.

Fig. 2 is a cross sectional view of an electro-sensitive recording blank according to the invention.

Fig. 3 is a sectional view of a contact rectifier according to the invention.

Fig. 4 is a sectional view of a transistor according to the invention.

Fig. 5 is a schematic diagram of a coated static discharge belt or the like according to the invention.

The present invention is based upon the discovery that if certain metals are incorporated in a special way with titanium dioxide, as described in detail hereinbelow, the specific resistance of the titanium dioxide is greatly lowered permitting it to be used in various fields of application where electric conductivity is a desideratum.

A complete understanding of the invention may be gained from the following detailed description in which the metals zinc and aluminum are used as examples of the metal added to the titanium dioxide. The invention is not limited to the use of zinc or aluminum metals to modify the titanium dioxide, as it has been found that most divalent and trivalent metals produce equally satisfactory results. For example, it has been found that the added titanium can be replaced by zinc, copper, manganese, nickel, iron, tin, bismuth, lead, calcium, barium, cadmium, magnesium, etc.

In the preparation of resistance materials of the type contemplated by the present invention various procedures may be followed. or example, in the preparation of one particular combination, an intimate mixture of 60.0 g. of titanium dioxide and 3.0 g. of zinc formate is first formed by dissolving the formate in 45.0 g. of water and adding this to the titanium dioxide to form a slurry. This slurry is then dried at approximately 110° C. until all the water has been removed. The dried cake is then pulverized and placed in a combustion tube. A vacuum is then produced in the tube and the temperature of the tintanium dioxide-formate mixture brought up to 700° C. and held there for five minutes. The tube is then cooled, the vacuum released, and the titanium dioxide-metal mixture removed. The resultant material is found to be an almost white powder in which no crystal growth has taken place and in these respects it is almost identical to the original titanium dioxide used. Upon measuring the resistance it was found that the material had a resistivity of approximately 100,000 ohm-cm. This value was determined from a pressed disc 0.003 cm. in thickness. Ordinary or unmodified titanium dioxide when measured in a similar manner has a resistivity of almost infinity. The modified titanium dioxide material was also found to fluoresce in the visual region of the spectrum (4800 to 5400 Angstrom units) when activated by ultra-violet light.

Instead of using a vacuum for firing, it has been found that an equally satisfactory semiconductor material may be produced by firing in the presence of an inert gas such as hydrogen, nitrogen, carbon dioxide, etc.

The presence of impurities does not seem to be a serious factor in producing a semiconductor of low specific resistance according to the invention. Thus ordinary commercial titanium dioxide is just as satisfactory as a purified grade. This is also true of the formate. It has also been found that the water used in making the slurry need not be of high purity. This is contrary to the conditions that must exist in the manufacture of fluorescent materials as is well-known to those skilled in the art.

In the preparation of a titanium dioxide-aluminum semiconductor material the following example of preparation is given. An intimate mixture of 60.0 g. of titanium dioxide and 0.3 g. of aluminum formate is first formed by dissolving the aluminum formate in 45.0 g. of water and adding this to the titanium dioxide to form a slurry. This slurry is dried as already outlined. The dried cake is pulverized and placed in a combustion tube. The air in the tube is replaced with hydrogen gas and the temperature of the titanium dioxide mixture brought up to 800° C. and held there for five minutes. The tube is then cooled, the gas flow cutoff and the semiconductor material removed. The material was found to be very similar to the semiconductor described above. It had a resistivity of approximately 100,000 ohm-cm. and was found to fluoresce in the visual region of the spectrum.

While the exact reason why the modified titanium dioxide has the above-noted desired results is not fully understood, it is believed that in the firing of the various mixtures the metallic-organic compounds decompose into pure metal which becomes a part of the titanium dioxide crystal lattice. In this connection it is therefore not necessary to use a metallic formate but any metallic-organic compound or the like which will easily break down into pure metal and volatile compounds in the inert high temperature atmosphere of the furnace will function equally as well.

It has also been found that more than one metal may be incorporated in the semiconductor material. Thus, if a slurry of 60.0 g. of titanium dioxide, 1.50 g. of zinc formate, 0.15 g. of aluminum formate and 45.0 g. of water is prepared and processed as indicated in either one of the above examples the finished semiconductor material will also have a resistivity of approximately 100,000 ohm-cm. and will fluoresce in the visual region of the spectrum. A slightly different procedure may also be used for preparing the base materials before firing. Thus for a silver activated titanium dioxide material a mixture of 60.0 g. of titanium dioxide, 3.0 g. of silver carbonate and 50.0 g. of water may be prepared and the slurry ball milled for 48 hours. This slurry may then be dried and fired as already outlined. The ball milling is necessary in this example because the silver carbonate is insoluble in water and for best results as intimate a mixture as possible is desirable. The finished semiconductor material will have a resistivity of approximately 50,000 ohm-cm. and will fluoresce in the visual region of the spectrum.

The resistivity of the semiconductor material is varied by changing the amount of metallic-organic salt present in the slurry which eventually means a variation in the amount of excess metal present in the finished titanium dioxide semiconductor. A variation in resistivity of from 3000 ohm-cm. to the almost infinite resistivity value for the original titanium dioxide is possible. In the case of the titanium dioxide aluminum semiconductor material of the example given above a resistivity of 3000 ohm-cm. can be obtained by incorporating approximately 5.0 g. of aluminum formate in the slurry instead of the 0.3 given in the example.

In the finished titanium dioxide-activator metal material the activator metal may be present to the extent of from 0.2% to 20% producing a material having a specific resistivity in the range between $3 \times 10^3$ to $10^6$ ohm-cm.

The length of time that the semiconductor material is kept at the high temperature in the furnace may vary considerably without doing any damage to the product. Thus, material has been kept at the high temperature for as long as six hours with no apparent detrimental effect upon it.

Referring to Fig. 1 of the drawing, there is shown a resistor composed mainly of a compacted or compressed body 10 of the titanium dioxide semiconductor prepared according to the above described methods. The body 10 may be of simple cylindrical shape, or flat shape, or any other shape usually employed in resistors, and is provided with the usual connector wires 11, 12, which may be imbedded or otherwise integrally united to the resistor body.

Fig. 2 shows in cross section an electro-sensitive recording blank consisting, for example, of a paper or similar flexible backing member 17 having a coating 18 of conductive material such for example as carbon black mixed with a suitable binder. Superposed on the coating 18 is a masking coating 19 composed of the titanium dioxide semiconductor material hereinabove described. The semiconductor material may be mixed with a suitable binder, as described for example in U.S. Patent No. 2,398,779, so that it can be coated on to the surface 18 by any well-known coating process, after which the solvents for the binder are removed by drying, thus leaving a whitish outer surface on the blank constituted of the semiconductor 19. Electric signal voltages to be recorded can be applied to the surface 19 by a suitably energized stylus 20 which results in removal of the coating 19 in minute elemental areas directly underneath the stylus 20 so as to expose the black or dark colored conductive coating 18. If desired, the paper 17, instead of being a nonconductor coated with the conductive coating 18, may be a conductive paper, which has been rendered conductive and dark in surface color by being impregnated with a suitable conductive material either during manufacture of the paper or after the manufacture of the paper. This dark colored conductive paper is then coated with the semiconductor titanium dioxide coating 19. If desired, the backing 17 can be a plastic film which has dispersed throughout the body thereof a conductive filler such as conductive carbon. Applied to this dark colored conductive plastic is the titanium dioxide semiconductor coating 19 above described.

Fig. 3 shows a rectifier of the asymmetric interface type. It may comprise, for example, a disc 13 of a suitable metal such as copper or zinc which is held in contact with another disc 14 formed of the titanium dioxide semiconductor prepared as above described. The discs 13 and 14 may be held in contact with each other by any well-known pressure means, and suitable connector wires 15 and 16 are provided for connecting the rectifier in circuit.

Referring to Fig. 4, there is shown a transistor comprising the metal base or plug member 21, for example of copper, to which is applied a layer 22 of a titanium dioxide semiconductor material above described. Supported in contact with the material 22 is the fine pointed emitter electrode 23, and supported with its point in contact with layer 22 and closely adjacent to the point of emitter 23 is the collector electrode 24. The emitter electrode 23 can be connected through a suitable input impedance 25 to a suitable source of input signals, and the collector electrode 24 can be connected through a suitable output impedance 26 to the output circuit. The elements 23 and 24 may be Phosphor-bronze wires of approximately 0.002" diameter with their tips spaced several mils apart while in contact with the surface of layer 22. The emitter electrode 23 can be biased positively, for example, by the biasing battery 27 and the collector electrode 24 can be biased negatively by the battery 28. On the other hand, if the electrode 23 is biased negatively then the collector electrode 24 can be biased positively. If desired, a source of pulsed voltage (not shown) may be connected across the electrodes 23 and 24 instead of, or supplementary to, the biasing source 27 and 28, to enable either electrode to be used as an emitter.

Referring to Fig. 5, there is shown a movable web or belt 29 which, because of its frictional engagement with suitable supports, for example rollers 30, 31, tends to accumulate a static electric charge. Heretofore considerable difficulty has been encountered in discharging such static charge from moving webs which in themselves are non-conductors. By applying to the web 29 a coating 32 of a titanium dioxide semiconductor above-mentioned, it is possible to connect the web to ground to prevent the accumulation of undesired electrostatic charges.

The expression "modified titanium dioxide," as employed in the claims, means titanium dioxide which normally is a non-conductor but which has been treated to render it a conductor or semi-conductor by any of the processes described herein.

What is claimed is:

1. A whitish pigment powder consisting mainly of normally non-conductive titanium dioxide which has been heated in a non-oxidizing atmosphere with a metal which is a heat decomposition product of a metal compound wherein the metal has a valence of not less than two nor more than three and with the metal constituting 0.2 percent to 20 percent of the pigment, the said heating having been limited to a temperature ranging from 600 degrees C. to 900 degrees C. to prevent substantial crystal growth taking place in the titanium dioxide and which has been cooled in a non-oxidizing atmosphere for imparting substantial electric conductivity to the titanium dioxide itself by incorporating the said metal as part of the crystal lattice.

2. A whitish pigment powder consisting mainly of normally non-conductive titanium dioxide which has been heated in a non-oxidizing atmosphere together with a metallo organic compound wherein the metal of the compound has a valence of not less than two nor more than three to remove the organic constituents of the compound and to form said metal in situ therefrom, the metal constituting from 0.2 percent to 20 percent of the pigment, the said heating having been limited to a temperature ranging from 600 degrees C. to 900 degrees C. to prevent substantial crystal growth taking place in the titanium dioxide and which has been cooled in a non-oxidizing atmosphere for imparting substantial electric conductivity to the titanium dioxide itself.

3. The method of making a whitish powdered conductive pigment consisting mainly of titanium dioxide which comprises mixing normally non-conductive titanium dioxide with a metal in the form of a heat decomposition product of a metal compound wherein the metal has a valence not less than two nor more than three, firing the mixture in a non-oxidizing atmosphere with the firing temperature range from approximately 600 degrees C. to an upper temperature at which no substantial sintering takes place and to avoid any substantial change in the crystal structure of the titanium dioxide but simultaneously inducing electric conductivity into the titanium dioxide itself by incorporating the said metal as part of the crystal lattice and while retaining the original whitish and powdered character of the normally non-conductive titanium dioxide, the said metal constituting from 0.2 percent to 20 percent of the pigment.

4. The method according to claim 3 in which the said firing is done at a temperature of between 600 degrees C. and 900 degrees C.

5. The method of making a whitish powdered conductive pigment consisting mainly of titanium dioxide which comprises mixing normally non-conductive titanium dioxide with a metal having a valence not less than two nor more than three and firing the mixture in a non-oxidizing atmosphere with the firing temperature ranging from approximately 600 degrees C. to an upper temperature at which no substantial sintering takes place and to avoid any substantial change in the crystal structure of the titanium dioxide but simultaneously inducing electrical conductivity into the titanium dioxide itself while retaining the original whitish and powdered character of the normally non-conductive titanium dioxide, the metal constituting from 0.2 percent to 20 percent of the pigment, the said non-conductive titanium dioxide having been mixed with a metallo organic compound prior to said firing and the mixture having been then fired to remove the organic constituents of said compound and thereby to derive said metal in situ.

6. The method of making a whitish powdered conductive pigment consisting mainly of titanium dioxide which comprises mixing normally non-conductive titanium dioxide with a metal having a valence not less than two nor more than three and firing the mixture in a non-oxidizing atmosphere with the firing temperature ranging from approximately 600 degrees C. to an upper temperature at which no substantial sintering takes place and to avoid any substantial change in the crystal structure of the titanium dioxide but simultaneously inducing electrical conductivity into the titanium dioxide itself while retaining the original whitish and powdered character of the normally non-conductive titanium dioxide, the metal constituting from 0.2 percent to 20 percent of the pigment, the said non-conductive titanium dioxide having been mixed with a metallo organic compound in the form of an aqueous slurry, the said slurry being then dried and the dried material pulverized whereupon said pulverized material is subjected to said firing.

7. An electro-conductive recording blank comprising a sheet having an electrically conductive dark colored surface and an electro-sensitive masking coating on said surface, which coating includes a pigment which comprises whitish electrically conductive titanium dioxide having as part of the crystal lattice an activator metal having a valence of not less than two nor more than three which metal constitues from 0.2 percent to 20 percent of the pigment.

References Cited in the file of this patent

UNITED STATES PATENTS

| | | |
|---|---|---|
| 2,511,216 | Miller | June 13, 1950 |
| 2,555,321 | Dalton et al. | June 5, 1951 |
| 2,699,522 | Breckenridge | Jan. 11, 1955 |
| 2,749,596 | Breckenridge | June 12, 1956 |
| 2,766,509 | Le Loup et al. | Oct. 16, 1956 |

FOREIGN PATENTS

| | | |
|---|---|---|
| 648,423 | Great Britain | Mar. 3, 1951 |
| 1,012,093 | France | July 3, 1952 |